(12) United States Patent
Bauknecht et al.

(10) Patent No.: US 7,244,212 B2
(45) Date of Patent: Jul. 17, 2007

(54) SIX-SPEED AUTOMATIC GEARBOX

(75) Inventors: Gert Bauknecht, Friedrichshafen (DE); Manfred Bucksch, Friedrichshafen (DE); Lutz Gärtner, Langenargen (DE); Heribert Scherer, Meckenbeuren (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 285 days.

(21) Appl. No.: 10/514,065

(22) PCT Filed: May 5, 2003

(86) PCT No.: PCT/EP03/04672

§ 371 (c)(1),
(2), (4) Date: Nov. 10, 2004

(87) PCT Pub. No.: WO03/095866

PCT Pub. Date: Nov. 20, 2003

(65) Prior Publication Data

US 2005/0130788 A1  Jun. 16, 2005

(30) Foreign Application Priority Data

May 11, 2002  (DE) ................................ 102 21 096

(51) Int. Cl.
*F16H 3/44* (2006.01)
(52) U.S. Cl. .................. 475/284; 475/313; 475/325
(58) Field of Classification Search ............... 475/269, 475/275, 277, 278, 284, 288, 313, 325
See application file for complete search history.

(56) References Cited

U.S. PATENT DOCUMENTS

| 3,941,013 | A   | 3/1976  | Miller            |         |
|-----------|-----|---------|-------------------|---------|
| 5,106,352 | A   | 4/1992  | Lepelletier       |         |
| 5,716,298 | A * | 2/1998  | Beim et al.       | 475/275 |
| 6,110,069 | A   | 8/2000  | Taniguchi et al.  |         |
| 6,139,463 | A   | 10/2000 | Kasuya et al.     |         |

(Continued)

FOREIGN PATENT DOCUMENTS

DE  102 10 348 A1  10/2003

(Continued)

*Primary Examiner*—Roger Pang
(74) *Attorney, Agent, or Firm*—Davis Bujold & Daniels, P.L.L.C.

(57) ABSTRACT

The invention concerns an automatic gearbox, with a drive input shaft (3) which is connected to a shiftable reduction planetary gear set (10), with a drive output shaft (4) which is connected to a shiftable main planetary gear set (30), and with five shifting elements (A to E) by the selective closing of which six forward speeds can be engaged without range change. An output element of the reduction planetary gear set (10) can be connected via a first shifting element (A) to a first input element of the main planetary gear set (30) and via a second shifting element (B) to a second input element of the main planetary gear set (30). The drive input shaft (3) can be connected via a fifth shifting element (E) to a third input element of the main planetary gear set (30). A solar gear wheel (11) of the reduction planetary gear set (10) is in particular fixed on a cylindrical projection (43) of a gearbox housing wall (41). The reduction planetary gear set (10) is made as a Plus transmission with inner and outer planetary gear wheels (12, 15), whose webs (14, 17) are connected to one another.

33 Claims, 3 Drawing Sheets

U.S. PATENT DOCUMENTS 6,723,018 B2 4/2004 Hayabuchi et al.
6,827,664 B2 * 12/2004 Stevenson et al. .......... 475/275
2004/0116238 A1 * 6/2004 Ziemer ....................... 475/296

FOREIGN PATENT DOCUMENTS

| | | |
|---|---|---|
| EP | 0 962 680 A2 | 12/1999 |
| EP | 0 984 203 A2 | 3/2000 |
| EP | 0 997 663 A2 | 5/2000 |
| JP | 2000-55151 A | 2/2000 |
| JP | 2000-55152 A | 2/2000 |
| JP | 2001-182785 A | 7/2001 |
| JP | 2001-349390 A | 12/2001 |

* cited by examiner

Fig. 1

CLOSED SHIFTING ELEMENTS

| SPEED | CLUTCH | | | BRAKE | | GEAR RATIO | STEP |
|---|---|---|---|---|---|---|---|
| | A | B | E | C | D | | |
| 1 | o | | | | o | 4.99 | |
| | | | | | | | 1.78 |
| 2 | o | | | o | | 2.80 | |
| | | | | | | | 1.54 |
| 3 | o | o | | | | 1.82 | |
| | | | | | | | 1.52 |
| 4 | o | | o | | | 1.20 | |
| | | | | | | | 1.44 |
| 5 | | o | o | | | 0.83 | |
| | | | | | | | 1.20 |
| 6 | | | o | o | | 0.69 | |
| | | | | | | | TOTAL |
| R | | o | | | o | -4.07 | 7.23 |

STATIONARY GEAR RATIO :

$i_{ORS1} = +2.22$ $i_{ORS2} = -2.23$ $i_{ORS3} = +2.74$

SIX-SPEED AUTOMATIC GEARBOX

The present invention concerns an automatic gearbox with six forward speeds, according to the preamble of claim 1.

From U.S. Pat. No. 5,106,352 A several transmission schemes for automatic gearboxes are known, which have a non-shiftable reduction planetary gear set and a shiftable main planetary gear set, in which the selective closing of five shifting elements enables a total of six forward speeds to be engaged without range change. In these the main planetary gear set is formed as a two-web, four-shaft transmission unit with two coupled planetary gear sets, in the known configuration of a Ravigneaux gear set. The non-shiftable reduction gear set can be formed as a single-web planetary transmission unit with an element of the reduction gear set—preferably its solar gear wheel—in fixed connection with the gearbox housing. The reduction gear set is driven with the input speed of the gearbox and always produces a reduced output speed that can be transmitted via two shift elements to two different elements of the main gear set. In addition, a third element of the main gear set can be driven via a further clutch directly with the gearbox input speed.

Appropriate component arrangements for an automatic gearbox with the gear set concept of U.S. Pat. No. 5,106,352 A are also known for example from U.S. Pat. No. 6,139,463 A and the not previously published German patent application DE 10210348.8 by the present applicant.

Finally, from U.S. Pat. No. 3,941,013 A a transmission scheme for an automatic gearbox with six forward speeds is known, which comprises a shiftable reduction gear set made as a single-web planetary transmission and a main gear set consisting of two coupled single-web planetary transmissions. Two of the three input elements of the main gear set are in fixed connection with one another. The reduction gear set is made as a so-termed Plus transmission with double planetaries whose webs are connected to one another, and it works as a reducing transmission up to operation in the sixth gear, in which it rotates as a block. Here, "Plus" transmission means a simple planetary transmission with a positive static transmission ratio; thus, the ratio between the rotation speeds of the annular and the solar gear wheels is positive when the web is notionally static. The solar gear wheel of the said reduction gear set can be fixed relative to the gearbox housing by means of a brake positioned spatially between the reduction gear set and the main gear set. The reduction gear set is driven at the gearbox input speed via its coupled web, and its output takes place via its annular gear wheel. The output speed of the reduction gear set can be transmitted via two clutches to two different input elements of the main gear set, and one of these two input elements of the main gear set can additionally be driven via another clutch directly with the transmission input speed. The said other clutch is positioned on the side of the reduction gear set facing away from the main gear set. Because of the spatial arrangement of the brake via which the solar gear wheel of the reduction gear set can be fixed and the spatial arrangement of the clutch by which the transmission input speed can be transmitted to the main gear set, the configuration of the reduction gear set's drive input and output is structurally elaborate. Thus, the drive input of the reduction gear set must be located radially outside over its annular gear wheel, i.e., the drive input of the reduction gear set overlaps the reduction gear set completely. Furthermore, the drive output of the reduction gear set must be configured centrally through the solar gear wheel of the reduction gear set to the input elements of the two clutches which are formed as outer disk carriers. For the engagement of the six forward gears, the gear set of U.S. Pat. No. 3,941,013 A entails several range shifts.

The objective of the present invention is now, starting from the related prior art of JP-A-2000-055142, to develop further an automatic gearbox with six forward speeds that can be engaged without range change, with comparatively little structural elaboration, in particular as regards optimized lubrication of the reduction gear set.

This objective is achieved by an automatic gearbox having the characteristics defined by the principal claim. Advantageous features and further developments emerge from the subordinate claims.

Starting from the generic prior art of JP-A-2000-055152, the automatic gearbox comprises a non-shiftable reduction planetary gear set and a multi-component, shiftable main planetary gear set, formed for example as a two-web, four-shaft planetary transmission. The main planetary gear set comprises at least three mutually independent input elements. One input element of the main planetary gear set can be connected to a gearbox input shaft via a shifting element. The other two input elements of the main planetary gear set can be connected each via a respective further shifting element to an output element of the reduction planetary gear set.

In contrast to the prior art according to U.S. Pat. No. 3,941,013 the input element of the main planetary gear set that can be connected to the gearbox input shaft, can therefore not be connected to the output element of the reduction planetary gear set.

As in the generic prior art, according to JP-A-2-55152, the reduction planetary gear set is made as a non-shiftable Plus transmission unit with double planetary gears whose webs are connected to one another. Here, "Plus" transmission is understood to mean a simple planetary transmission with a positive static transmission ratio; the ratio between the rotation speeds of the annular and the solar gear wheel is thus positive when the web is notionally static. One element of the reduction planetary gear set is in fixed connection with the gearbox housing.

In accordance with a corresponding shift scheme involving a total of five shifting elements, six forward speeds can be engaged without range change. When shifting from one speed to the next-highest or next-lowest speed, of the shifting elements actually operative at the time in each case only one shifting element is opened and a different shifting element is closed. In addition a reverse gear can be engaged.

The construction of the reduction planetary gear set as a shiftable Plus transmission advantageously enables a larger spread compared with the generic state of the art, with speed-change steps as favorable as before.

According to the invention, it is proposed to drive the non-shiftable reduction planetary gear set via its coupled webs at the gearbox input speed and to connect the annular gear wheel of the reduction planetary gear set, as the output element thereof, with the input elements of the two clutches by means of which the output speeds of the reduction planetary gear set can be transmitted to the main planetary gear set. The solar gear wheel of the reduction planetary gear set is then in fixed connection with the gearbox housing.

Preferably, the reduction planetary gear set is arranged in the radial direction at least partially over a projection of the gearbox housing or a projection of an intermediate plate which is in fixed connection with the gearbox housing, with the solar gear wheel of the reduction planetary gear set attached to the said projection. This spatial arrangement of the reduction planetary gear set, preferably within the inside space of the gearbox on an outer side of the gearbox housing, in combination with a spatial arrangement of the two shifting elements by means of which the output speed of the reduction planetary gear set can be transmitted to the respectively associated input elements of the main planetary gear set, in the immediate vicinity of the reduction planetary gear set, enables a structurally simple and space-saving nesting of the components.

In the preferred embodiment the main planetary gear set is made as a Ravigneaux gear set, which is a known, structurally very compact form of a two-web, four-shaft planetary transmission. Clearly however, the non-shiftable reduction planetary gear set made as a Plus transmission can also be combined with structurally alternative planetary gear set arrangements comprising three input elements not coupled to one another.

Below, the invention is explained in greater detail with reference to the drawings FIG. 1 to FIG. 3, which show.

In all Figures, the reference symbols of comparable elements are also homogeneously designated.

Figure 1:
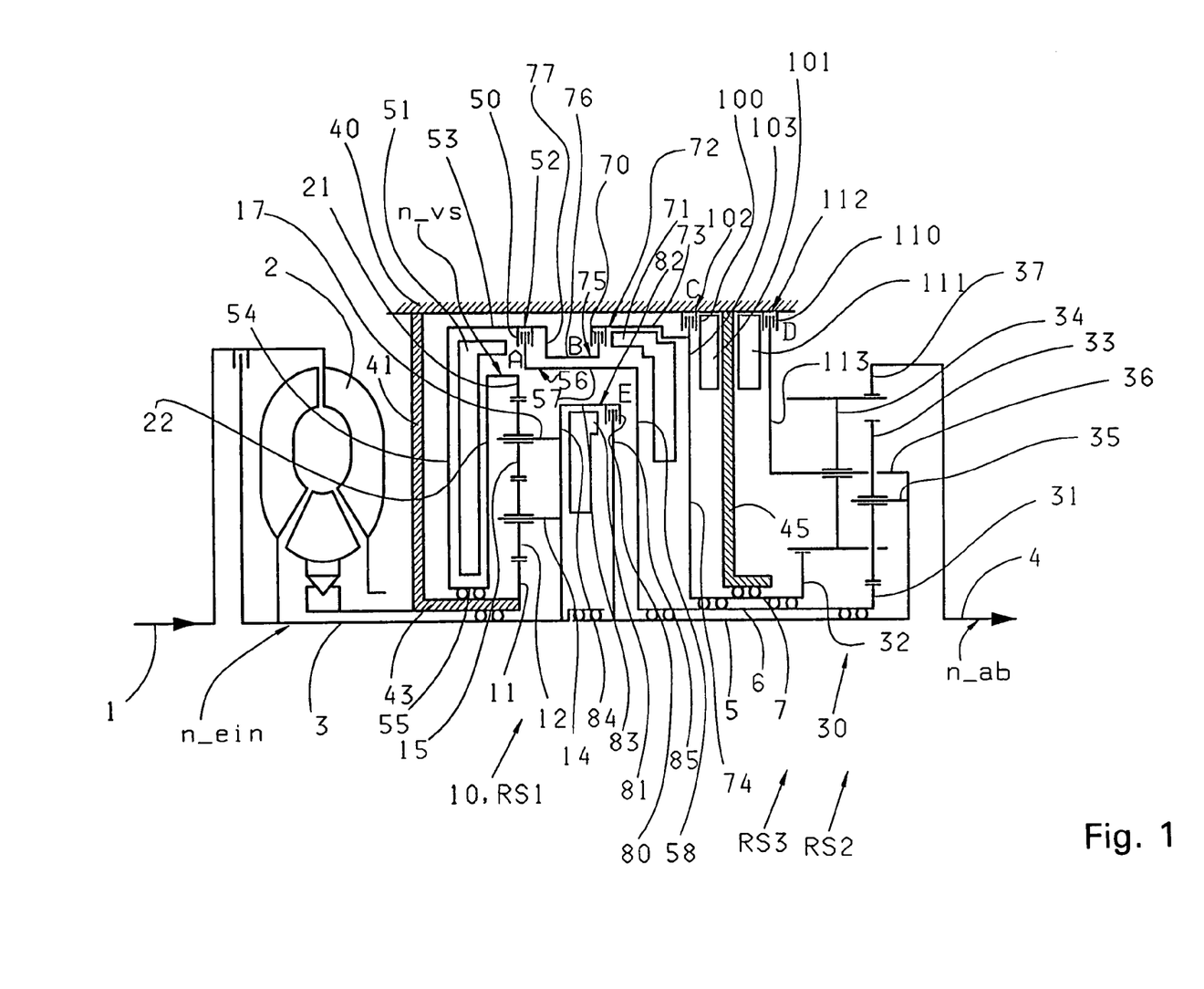
FIG. 1 is an example gearbox layout (drive input and drive output coaxial)

FIG. 1 now shows an example gearbox layout of an automatic gearbox according to the invention. An engine shaft, for example that of an internal combustion engine which drives the automatic gearbox, is indexed 1. A torque converter 2 of the usual type is provided between the engine shaft 1 and a drive input shaft 3 of the automatic gearbox that rotates at the gearbox input speed n_input. Clearly, instead of the torque converter 2 some other starting element can be provided, for example a separate starting clutch with a two-mass flywheel as a torque oscillation damper. A drive output shaft of the automatic gearbox rotating at the gearbox output speed n_output is indexed 4. The automatic gearbox comprises a non-shiftable reduction planetary gear set 10, which according to the invention is formed as a Plus transmission with positive static transmission ratio, and a shiftable main planetary gear set 30, formed for example as a two-web, four-shaft transmission of the Ravigneaux type. A total of five shifting elements A to E are provided.

The reduction planetary gear set 10, also denoted RS1, comprises a solar gear wheel 11, inner and outer planetary gear wheels 12 and 15, and an annular gear wheel 21. A web 14 of the inner planetary gear wheels 12 is in fixed connection with a web 17 of the outer planetary gear wheels 15. The drive input shaft 3 is connected to these coupled webs 14, 17. The annular gear wheel 11 constitutes the output element of the reduction planetary gear set 10. The solar gear wheel 11 is in fixed connection with a cylindrical projection 43 of a gearbox housing wall 41. In turn, the gearbox housing wall 41 is a fixed part of a gearbox housing 40. The gearbox housing 40 and its wall 41 can be made integrally. The projection 43 of the gearbox housing wall 41 can also be made as a separate hub. Thus, the reduction planetary gear set 10 is positioned coaxially at least partially above the projection 43. In the example described, the gearbox housing wall 41 forms the outer wall of the gearbox housing 40 on the side toward the engine shaft 1 and therefore toward the drive engine (not shown). The reduction planetary gear set 10 is thus positioned close to the drive, so that the connection of the coupled webs 14, 17 to the drive input shaft 3 is located spatially on the side of the reduction planetary gear set 10 away from the gearbox housing wall 41 and thus away from the drive engine.

The main planetary gear set 30 comprises two gear sets RS2 and RS3. The gear set RS2 has a small solar gear wheel 31 and first planetary gear wheels 33. The gear set RS3 has a large solar gear wheel 32 and second planetary gear wheels 34. A common annular gear wheel is indexed 37. A web 35 of the first planetary gear wheels 33 and a web 36 of the second planetary gear wheels 34 are in fixed connection with one another. The annular gear wheel 37 is connected to the drive output shaft 4. The coupled webs 35, 36 of the main planetary gear set 30 are connected on the one hand to a web shaft 5 and, via that web shaft 5 and the fifth shifting element E made as a clutch, can be connected to the drive input shaft 3. On the other hand the coupled webs 35, 36 are connected to an inner disk carrier 113 of the fourth shifting element D made as a brake and, via this brake D, can be fixed relative to the gearbox housing 40. The small solar gear wheel 31 of the main planetary gear set 30 is connected to a first solar shaft 6 and, via this first solar shaft 6 and the first shifting element A formed as a clutch, can be connected to the annular gear wheel 21 of the reduction planetary gear set 10. The large solar gear wheel 32 of the main planetary gear set 30 is connected on the one hand to a second solar shaft 7 and, via this second solar shaft 7 and the second shifting element B made as a clutch, can be connected to the annular gear wheel 21 of the reduction planetary gear set 10. On the other hand, the large solar gear wheel 32 is connected with an inner disk carrier 103 of the third shifting element C made as a brake and, via this brake C, can be fixed relative to the gearbox housing 40.

The structure of the main planetary gear set 30 shown in FIG. 1 as a Ravigneaux gear set is to be viewed only as an example. The main planetary gear set can also be formed from other combinations of individual planetary gear set. In this, the only essential features are that an output speed n_vs of the reduction planetary gear set 10 should be able to be transmitted via two shifting elements (here the clutches A and B) to two different input elements of the main planetary gear set not connected to one another, and that the gearbox input speed n_input should be able to be transmitted via a further shifting element (here the clutch E) to a third free input element of the main planetary gear set. The coaxial arrangement of the drive, the reduction planetary gear set and the main planetary gear set should also be regarded as an example. Clearly, the automatic gearbox according to the invention can also have a spur gear between the output element of the main planetary gear set and the drive output shaft 4, and/or an angled or even axis-parallel connection between the reduction and main planetary gear sets.

All five of the shifting elements A to E are arranged spatially on the side of the main planetary gear set 30 facing toward the reduction planetary gear set 10. In this arrangement the clutches A, B and E, more particularly their disks 50, 70 and 80 respectively, are located close to the reduction planetary gear set 10. The clutch E is axially directly adjacent to the reduction planetary gear set 10 in the direction of the main planetary gear set. The disks 80 of the clutch E are arranged on a diameter of similar size to the annular gear wheel 21 of the reduction planetary gear set 10. The disks 50 of the clutch A are at least largely above the annular gear wheel 21 of the reduction planetary gear set 10, and the disks 70 of the clutch B at least partly above the disks 80 of the clutch E. Thus, the clutch B is closer to the main planetary gear set 30 than is the clutch A.

The input element of the fifth shifting element E is formed as an outer disk carrier 82, which is in active connection with the drive input shaft 3 on the side of the reduction planetary gear set 10 facing toward the main planetary gear set 30. The outer disk carrier 82 is in the form of a cylinder open in the direction of the main planetary gear set 30, with a cylindrical section 83 and a disk-shaped section 84. The outer diameter of the outer disk carrier 82 is approximately as large as or slightly larger than the outer diameter of the annular gear wheel 21 of the reduction planetary gear set 10. The disk-shaped section 84 of the outer disk carrier 82 is axially directly adjacent to the reduction planetary gear set 10 and is connected to its coupled webs 14, 17 and to the drive output shaft 3. The cylindrical section 83 of the outer disk carrier 82 follows on from this disk-shaped section 84 and extends axially toward the main planetary gear set 30 as far as the disks 80 of the clutch E.

The output element of the fifth shifting element E is formed as an at least largely disk-shaped inner disk carrier 85 and extends centrally as far as the middle of the gearbox, where it is connected to the web shaft 5. The web shaft 5 is appropriately mounted on the drive input shaft 3.

A servomechanism 81 of the clutch E is for example arranged inside the cylindrical outer disk carrier 82 of the clutch E, axially adjacent to the disk-shaped section 84 of the outer disk carrier 82 and to the inner disk carrier 85 of the clutch E, and actuates the disks 80 of the clutch E from the side of the disks 80 facing toward the reduction planetary gear set 10 in the direction of the main planetary gear set 30. This servomechanism 81, besides comprising an actuation device for the disks 80, can also comprise a device for compensating the dynamical pressure of a rotating piston space of the clutch E. By virtue of the proposed arrangement the servomechanism 81 of the clutch E always rotates at the gearbox input speed n_input, so that in an advantageous way any undesired idling of the piston space and—when present—also the pressure equalization space of the clutch E in the disengaged condition of the clutch E is reliably prevented, particularly after it has remained disengaged for long periods. This improves the shifting comfort when the clutch E is engaged.

The input element of the first shifting element A is formed for example as an outer disk carrier 52, namely a cylinder open toward the main planetary gear set 30 and having a cylindrical section 53, a disk-shaped section 54 and a hub 55. The outer disk carrier 52 is arranged mainly on the side of the reduction planetary gear set 10 facing away from the main planetary gear set 30 and overlaps the annular gear wheel 21 of the reduction planetary gear set 10 in the area of the disks 50 of the clutch A. The hub 55 of the outer disk carrier 52 is mounted on the cylindrical projection 43 of the gearbox housing wall 41, to which the solar gear wheel 11 of the reduction planetary gear set 10 is attached, spatially between the gearbox housing wall 41 and the reduction planetary gear set 10, i.e., on the side of the latter facing away from the main planetary gear set 30. The disk-shaped section 54 of the outer disk carrier 52 is connected to the hub 55 and extends—axially adjacent to the gearbox housing wall 41—radially in the direction of the disks 50 of the clutch A. The disk-shaped section 54 ends, on a large diameter, in the cylindrical section 53 of the outer disk carrier 52 which extends axially toward the main planetary gear set 30 as far as the disks 50 of the clutch A.

The hub 55 of the outer disk carrier 52 of the clutch A is connected by positive engagement with a disk-shaped annular gear wheel support 22 of the annular gear wheel 21 as the output element of the reduction planetary gear set 10, this annular gear support 22 being directly adjacent to the reduction planetary gear set 10 on the side thereof opposite to the main planetary gear set 30 and extending outwards from the annular gear wheel 21 centrally in the direction of the drive input shaft 3 as far as the hub 55 of the outer disk carrier 52.

The output element of the clutch A is correspondingly formed as an inner disk carrier 56 in the form of a cylinder open toward the gearbox housing wall 41 the engine shaft 1, with a cylindrical section 57 and a disk-shaped section 58. The cylindrical section 57 extends—in the radial direction above the outer disk carrier 82 of the clutch E—from the disks 50 of the clutch A axially toward the main planetary gear set 30 as far as over the outer disk carrier 82 and the disks 80 of the clutch E. The cylindrical section 57 ends in the disk-shaped section 58 of the inner disk carrier 56 and extends centrally toward the middle of the gearbox as far as the first solar shaft 6, which runs directly above the web shaft 5, and is connected to said first solar shaft 6.

Since the disks 50 of the clutch A are arranged at least mainly above the reduction planetary gear set 10 and in the direction of the main planetary gear set 30 the clutch E comes directly after the reduction planetary gear set 10, the output element of the clutch A, formed for example as an inner disk carrier 56, overlaps the clutch E completely.

A servomechanism 51 of the clutch A is arranged for example inside the cylindrical outer disk carrier 52 of the clutch A, on the side of the reduction planetary gear set 10 opposite the main planetary gear set 30. The servomechanism 51 is preferably directly adjacent to the disk-shaped section 54 of the outer disk carrier 52 and at least partially also to the disk-shaped annular gear wheel support 22 of the annular gear 21. The servomechanism 51 actuates the disks 50 of the clutch A toward the main planetary gear set 30. Depending on the space taken up by the disk pack of the clutch A in the axial direction relative to the annular gear wheel 21, an actuation element of the servomechanism 51 can also overlap the annular gear wheel 21 of the reduction planetary gear set 10, at least partially. Like the example of the servomechanism 81 of the clutch E described earlier, the servomechanism 51, besides its actuation element for the disks 50, can also comprise a dynamical pressure compensator for the rotating clutch A. Advantageously, the servomechanism 51 of the clutch A always rotates at the output speed n_vs of the reduction planetary gear set 10, so that undesired idling of the piston space and perhaps also the pressure equalization space are avoided, particularly when the clutch A has not been engaged for a long time.

The input element of the second shifting element B is made for example as an inner disk carrier 75, with a cylindrical section 76 and a short disk-shaped section 77. The disk-shaped section 77 is connected on a large diameter with the outer disk carrier 52 of the clutch A, adjacent to the disks 50 of the clutch A on their side facing the main planetary gear set 30. Connected to the disk-shaped section 77 is the cylindrical section 76 of the inner disk carrier 75, which extends—radially above the cylindrical section of the inner disk carrier 56 of the clutch A—axially toward the main planetary gear set 30 as far as the disks 70 of the clutch B. The disks 70 of the clutch B, which are axially adjacent to the disks 50 of the clutch A in the direction of the main planetary gear set 30, preferably have the same diameter as the disks 50 of the clutch A, or at least a similar diameter. Besides the production-technological advantage of similar components this also allows the number of disks of the two clutches A, B, which experience the same torque loading, to be kept as small as possible.

The output element of the clutch B is made for example as an outer disk carrier 72 in the form of a cylinder open toward the gearbox housing wall 41 or the engine shaft 1, with a cylindrical section 73 and a disk-shaped section 74. The cylindrical section 73 extends—in the radial direction above the cylindrical section 57 of the inner disk carrier 56 of clutch A—from the disks 70 of the clutch B axially toward the main planetary gear set 30 over the inner disk carrier 56 of the clutch A and as far as an area of the disks 100 of the brake C. This cylindrical section 73 is followed by the disk-shaped section 74 of the outer disk carrier 72, which extends centrally toward the middle of the gearbox as far as the second solar shaft 7, which runs coaxially directly above the first solar shaft 6, and is connected to said second solar shaft 7. In the area of its largest diameter the disk-shaped section 74 of the outer disk carrier 72 is connected to the inner disk carrier 103 of the brake C. In an advantageous embodiment this inner disk carrier 103 of the brake C can be integrated in the outer disk carrier 72 of the clutch B, i.e., the outer disk carrier 72 and the inner disk carrier 103 can be made integrally as one piece.

Since the disks 70 of the clutch B are arranged at least partly over the disks 80 of the clutch E and the inner disk carrier 56 of the clutch A completely overlaps the clutch E, the inner disk carrier 56 constituting the example output element of the clutch A passes through the clutch space of clutch B, which is formed in particular by the outer disk carrier 72 of the clutch B.

A servomechanism 71 of the clutch B is arranged for example inside the cylindrical outer disk carrier 72 of the clutch B, preferably directly adjacent to the disk-shaped section 74 of the outer disk carrier 72 of clutch B and also adjacent to the disk-shaped section 58 of the inner disk carrier 56 of the clutch A. The servomechanism 71 actuates the disks 70 of the clutch B in the direction of the reduction planetary gear set 30. Depending on the space taken up by the disk pack of clutch B in the axial direction relative to the clutch E and relative to the inner disk carrier 56 of clutch A, which radially surrounds the clutch E axially in the direction of the main planetary gear set 30, an actuation element of the servomechanism 71 also partially overlaps the cylindrical section 57 of the inner disk carrier 56 of the clutch A. Besides the actuation device for the disks 70, the servo-mechanism 71 can obviously also comprize dynamical pressure compensation for the rotating clutch B. The servo-mechanism 71 always rotates at the same speed as the large solar gear wheel 32 of the main planetary gear set 30.

Thus, as viewed spatially, the clutch B is positioned completely between the reduction and the main planetary gear set 10, 30.

The arrangement of the clutch E on a smaller diameter than the clutches A and B enables a design of all three of the clutches A, B, E optimized in relation component length, with a small number of disks, taking account of the clutch-specific instantaneous loading. As is known, the clutch E has to transmit the drive torque imposed by the engine shaft 1. In contrast, the clutches A, B have to transmit a drive torque which in most operating conditions is increased by the reduction planetary gear set 10. The arrangement of the clutch E on a smaller diameter than the clutches A and B, radially under the disk-shaped section 57 of the output element of clutch A and radially under the disks 70 of clutch B, in combination with the arrangement of the disks 50 of clutch A radially above the reduction planetary gear set 10, thus enables a design of the structural group consisting of the three clutches A, B, E and the reduction planetary gear set 10 of the automatic gearbox, which is of extremely compact length.

The formation of the input element of the clutch A as an outer disk carrier 52 and the input element of the clutch B as an inner disk carrier 75 enables a structurally simple design of the torque-transmitting connection points between these two input elements, since for example a correspondingly formed element of the inner disk carrier 75 is enclosed in disk-drive gearing of the outer disk carrier 52 and axially secured in the latter.

As can be seen in FIG. 1, the web shaft 5 and the two solar shafts 6, 7 are arranged coaxially one above the other, and in the example described also coaxially with both the drive input shaft 3 and the drive output shaft 4. The web shaft 5 is connected to the coupled webs 35, 36 of the main planetary gear set 30 as its third input element, on the side of the main planetary gear set 30 facing away from the reduction planetary gear set 10. For this, the web shaft 5 passes centrally through the main planetary gear set 30. The first solar shaft 6 passes coaxially above the web shaft 5, centrally within the main planetary gear set 30 as far as its small solar gear wheel 31 and is connected thereto—as the first input element of the main planetary gear set 30. The large solar gear wheel 32 of the main planetary gear set 30 is arranged on the side of the main planetary gear set 30 facing toward the reduction planetary gear set 10, and is connected to the second solar shaft 7, which runs coaxially above the first solar shaft 6—as the second input element of the main planetary gear set 30.

As regards the mounting of the three shafts 5, 6, 7 which extend above one another, and as regards the arrangement of the servomechanisms of the two brakes C, D, it is proposed according to FIG. 1 to provide a mounting plate 45 between the two brakes C, D, by means of which the second solar shaft 7 is mounted. Advantageously, this enables both suitable mounting of the outer disk carrier 72 of the clutch B, but also suitable mounting of the large solar gear wheel 32 of the main planetary gear set 30. The two servomechanisms 101, 111 of the brakes C, D are in a simple way arranged directly on this mounting plate 45, the servomechanism 101 of the brake C on the side of the mounting plate 45 facing the reduction planetary gear set 10 and the servomechanism 111 of the brake D on its side facing the main planetary gear set 30. The servo-mechanisms 101, 111 can even be integrated with the mounting plate 45. The outer disk carriers 102, 112 of the brakes C, D can be integrated with the gearbox housing 30, made as separate structural elements, or also integrated with the mounting plate 45.

The example arrangement of all the shifting elements and planetary gear sets described in FIG. 1 advantageously results in a structural length of the whole automatic gearbox with coaxial drive input and output, which is as short as possible.

Figure 2:
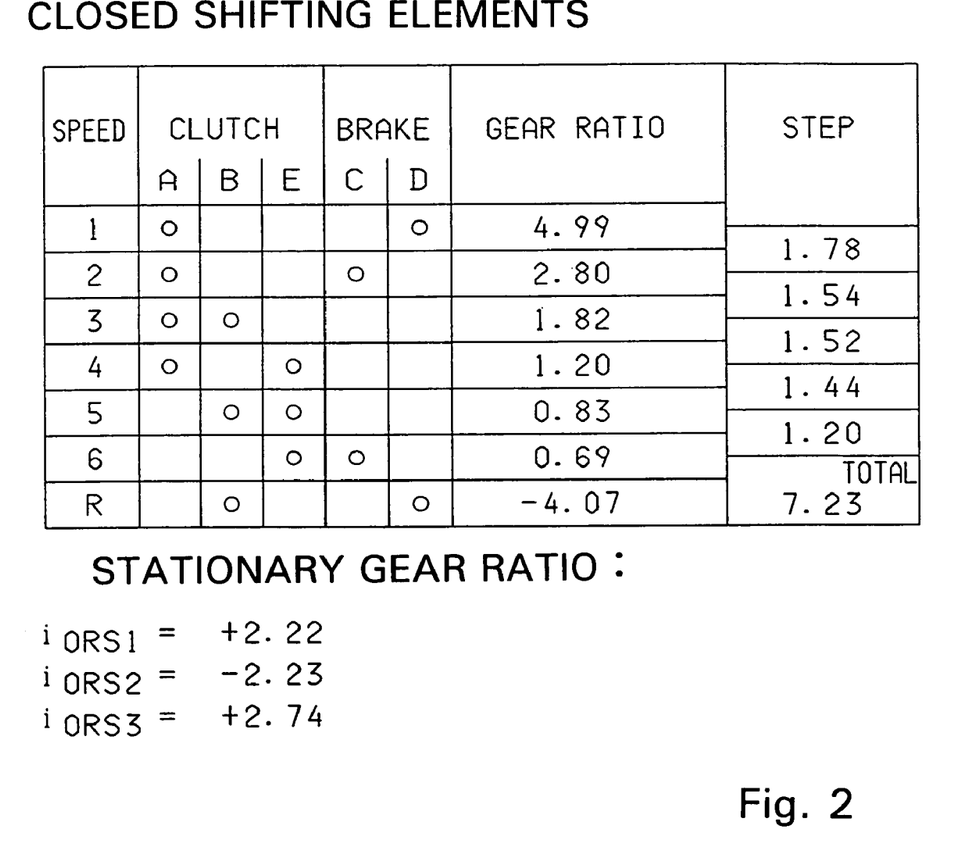
FIG. 2 is a shift scheme for the gearbox of FIG. 1.

An input speed n_input of the drive shaft 3 is transmitted to the output shaft 4 rotating at an output speed n_output by selective closing of the shifting elements A to E, in such manner that six forward gears can be engaged without range change, i.e., when shifting from one speed to the next-higher or next-lower speed, of those shifting elements which are actually actuated, in each case only one shifting element is opened and a different shifting element is closed. FIG. 2 shows the logical shifting scheme of the automatic gearbox according to FIG. 1, and the associated transmission ratios, steps and overall spread. Also shown are the static transmission ratios of the individual gear sets RS1, RS2 and RS3. Compared with the type-establishing six-speed automatic gearbox according to U.S. Pat. No. 5,106,352 A, the spread is advantageously much larger. In this, the speed steps achieved are harmonic.

Figure 3:
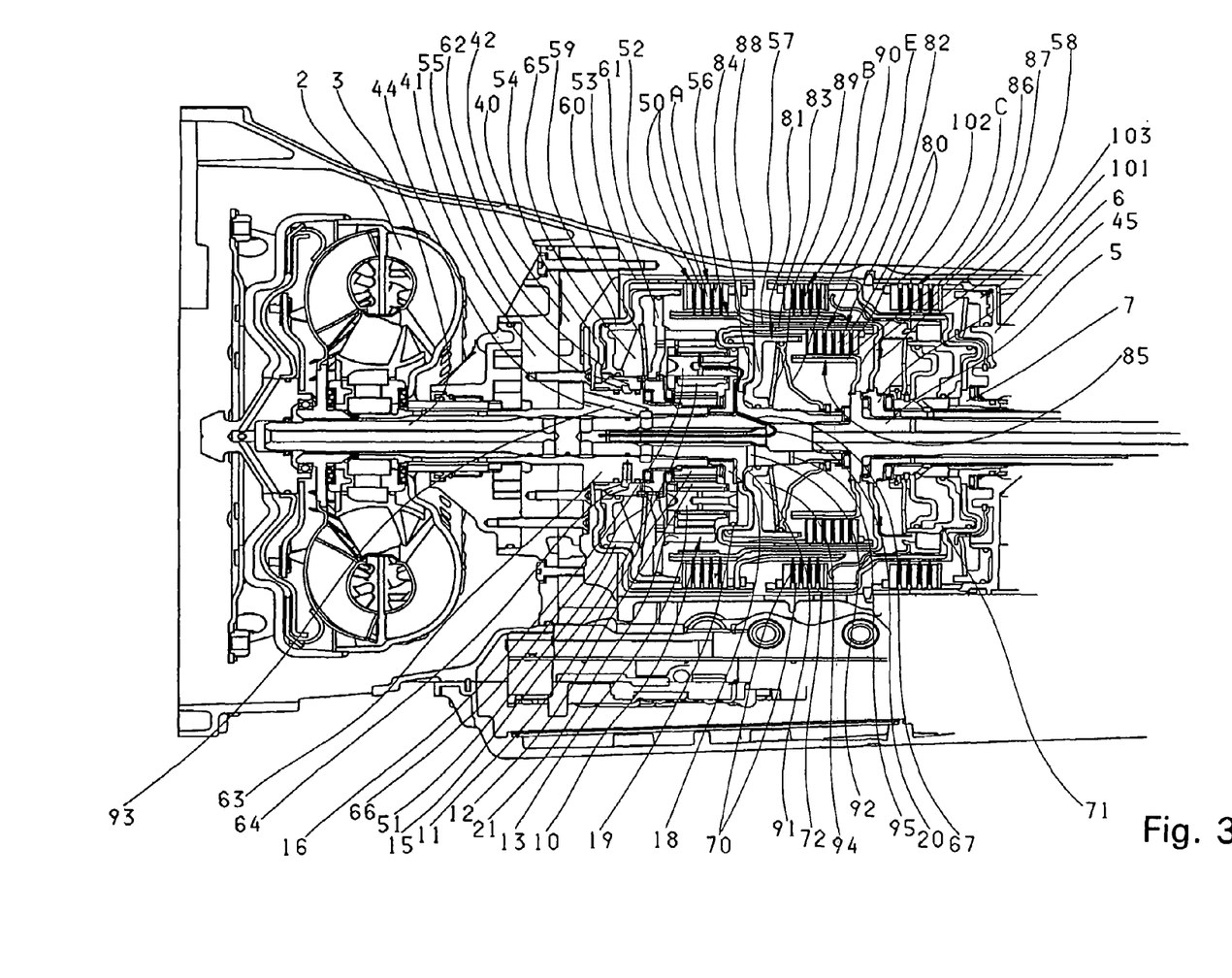
FIG. 3 is a design details of the component arrangement according to FIG. 1.

FIG. 3 shows a section of a transmission portion of the example automatic gearbox according to FIG. 1, also as an example of the detailed design of a structural group around the reduction planetary gear set, with reference to which further details of the invention will now be explained.

As can be seen in FIG. 3, the spatial arrangement of the reduction planetary gear set 10, the first, second and fifth shifting elements A, B, E each made as a clutch, and the third shifting element C made as a brake, within the gearbox housing 40 and relative to one another, corresponds to that represented schematically in FIG. 1.

The gearbox housing 40 of the automatic gearbox has a gearbox housing wall 41 forming an outer wall in the direction of a starting element of the gearbox formed for example as a torque converter 2. On the inside of the gearbox housing 40 an intermediate plate 42 is provided, which is bolted to the gearbox housing wall 41 and to the gearbox housing 40 and which, in particular, has various pressure medium channels which are not shown individually in greater detail. To this intermediate plate 42, in turn, is bolted a hub 44. The hub 44 comprises in particular a pressure feed channel 63 to a piston space 62 of the clutch A, and a pressure feed channel 93 to a piston space 91 of the clutch E. At least mainly over the hub 44 is arranged the reduction planetary gear set 10, its solar gear wheel 11 being fixed to the hub 44, preferably with positive locking by means of an appropriately formed carrier profile.

The reduction planetary gear set 10 formed according to the invention as a Plus transmission, comprizes, besides the solar gear wheel 11, at least one inner planetary gear wheel 12 mounted by means of a bolt 13 so that it can rotate on a web plate 18, at least one outer planetary gear wheel 15 also mounted by a bolt 16 to rotate on the web plate 18, and an annular gear wheel 21. Thus, the web plate 18 fulfils the function of coupling the respective webs of the inner and outer planetary gears 12, 15 and, as the input element of the reduction planetary gear set 10, is connected on the side of the reduction planetary gear set 10 opposite to the intermediate plate 42 with a drive input shaft 3 of the automatic gearbox which passes centrally through the hub 44 and the reduction planetary gear set 10, preferably with positive locking by means of an appropriately shaped carrier profile. The annular gear wheel 21 constitutes the output element of the reduction planetary gear set 10.

In accordance with the gearbox layout of FIG. 1, the annular gear wheel 21 of the reduction planetary gear set 10 is connected to an outer disk carrier 52 of the clutch A. The said outer disk carrier 52 of clutch A is formed as a cylinder open toward the direction opposite to the intermediate plate 42 and the torque converter 2, and is directly adjacent to the intermediate plate 42. Analogously to FIG. 1, the outer disk carrier 52 of the clutch A comprizes a hub 55, an at least largely disk-shaped section 54 and a cylindrical section 53. The hub 55 of the outer disk carrier 52 is arranged axially between the intermediate plate 42 and the reduction planetary gear set 10 above the hub 44 bolted to the intermediate plate 42, and is mounted radially on that hub 44. The disk-shaped section 54 of the outer disk carrier 52 is in fixed connection with the hub 55 of the outer disk carrier 52 and extends radially along the intermediate plate 42. On a large diameter the cylindrical section 53 of the outer disk carrier 52 is joined to its disk-shaped section 54, and extends axially in the direction opposite to the intermediate plate 42 as far as over the disks 50 of the clutch A, which are arranged in the radial direction above the annular gear wheel 21 of the reduction planetary gear set 10.

A servomechanism 51 of the clutch A is arranged inside the outer disk carrier 52 of the clutch A, axially adjacent to the reduction planetary gear set 10, and it actuates the disks 50 of the clutch A in the direction opposite to the intermediate plate 42 and the torque converter 2, i.e. toward the main planetary gear set (not shown). The servomechanism 51 of the clutch A comprizes a piston 59, a restoring spring 60 of the piston 59 made for example as a cup spring, and a baffle disk 61. The piston 59 and the outer disk carrier 52 form the piston space 62 of the clutch A, which can be pressurized via a pressure feed channel 64 of the (rotating) hub 55 of the outer disk carrier 52 and the pressure feed channel 63 of the hub 44 connected to the intermediate plate 42 (fixed to the housing). On the side of the piston 59 opposite the piston space 62 are arranged the restoring spring 60 and the baffle disk 61, in such manner that a pressure-tight pressure equalization space 65 is formed between the piston 59 and the baffle 61. This enables the dynamical pressure of the rotating piston space 62 of the clutch A to be compensated, preferably completely but at least in part. In the example illustrated, lubricant is delivered to the pressure equalization space 65 via a central lubricant bore of the drive shaft 3, via an (oblique, for example even radial) lubricant feed bore 67 of the drive shaft 3, via gaps of the carrier gearing between the drive shaft 3 and the web plate 18, via gaps of the carrier gearing between the hub 44 of the intermediate plate 42 and the solar gear wheel 11, via gaps in the mounting of the hub 55 of the outer disk carrier 52 on the hub 44 of the intermediate plate 42, and via a lubricant feed channel 66 of the hub 55 of the outer disk carrier 52. In the example shown, the baffle 61 is welded to the annular gear wheel 21 of the reduction planetary gear set 10 and additionally assumes the function of torque transfer between the annular gear wheel 21 and the hub 55 of the outer disk carrier 52 of the clutch A. In a different design it can also be provided, for example, that the baffle 61 is formed as a separate structural element and that the annular gear wheel 21 is connected to the hub 55 of the outer disk carrier 52 of clutch A with positive locking, for example by means of an annular gear wheel support.

The clutch E is arranged on the side of the reduction planetary gear set 10 opposite to the servomechanism 51 of the clutch A and the torque converter 2. An outer disk carrier 82 of the clutch E forms its input element and is connected to the drive input shaft 3. The outer disk carrier 82 of the clutch E is formed as a cylinder open in the direction opposite to the reduction planetary gear set 10 and the torque converter 2 and positioned directly adjacent to the reduction planetary gear set 10. Analogously to FIG. 1, the outer disk carrier 82 of the clutch E has an at least largely disk-shaped section 84 and a cylindrical section 83. The disk-shaped section 84 of the outer disk carrier 82 is in fixed connection with the drive input shaft 3 and extends radially, directly adjacent to the web plate 18, approximately as far as the outer diameter of the annular gear wheel 21 of the reduction planetary gear set 10. Here, the cylindrical section 83 of the outer disk carrier 82 is joined to its disk-shaped section 84 and extends axially toward the main planetary gear set (not shown) as far as the disks 80 of the clutch E.

Since the design is such that there is no relative rotation speed between the web plate 18 of the reduction planetary gear set 10 and the input element of the clutch E made for example as the outer disk carrier 82, in a particularly advantageous way a sealing element 19 can be provided between the web plate 18 and the outer disk carrier 82 on a diameter above the respective bolts 13, 16 of the inner and outer planetary gear wheels 12, 15 of the reduction planetary gear set 10. This sealing element 19 can be made simply as an O-ring, but the principle is such that any other known sealing systems too, such as lip-seal rings, rectangular rings, gaskets or lubricant-tight adhesive bonding, would be suitable. The lubricant feed to the bearings of the planetary gear wheels 12, 15 of the reduction planetary gear set 10 is indexed 20 in FIG. 3, and takes place via the central lubricant bore of the drive shaft 3, the lubricant bore 67 of the drive shaft 3 via the oblique lubricant bore of the drive shaft 3 through which the pressure equalization space 65 of clutch A is also supplied with lubricant, via a radial gap between the web plate 18 and the disk-shaped section 84 of the outer disk carrier 82 of clutch E, and via central and radial lubricant bores in the bolts 13, 16 of the planetary gear wheels 12, 15. This provides optimum lubricant supply to the rotating planetary gear wheels 12, 15 without the need for any elaborate additional component such as a lubricant baffle-strip attached to the web plate 18.

To ensure uniform lubricant supply to all the planetaries 12, 15 of the reduction planetary gear set 10 it can be provided that the diameters of the lubricant bores in the respective bolts 13, 16 of the inner and outer planetary gear wheels 12, 15 are matched to one another in such manner that the lubricant outflows of the "inner" bolts 13, which compared with that of the "outer" bolts 16 have a smaller part-circle diameter, correspond at least approximately to the lubricant outflows of the "outer" bolts 16. For example, to ensure this the central lubricant bore of the "outer" bolts 16 can have a slightly smaller diameter than the central lubricant bore of the "inner" bolts 13.

A servomechanism 81 of the clutch E is arranged inside its outer disk carrier 82, near the reduction planetary gear set 10, and actuates the disks 80 of the clutch E in the direction opposite to the reduction planetary gear set 10, i.e. toward the main planetary gear set (not shown). Like the servomechanism 51 of the clutch A, the servomechanism 81 of the clutch E also has dynamical pressure compensation means besides an actuation device for the disks 80. For this, the servomechanism 81 comprises a piston 88, a restoring spring 89 for the piston 88 made for example as a cup spring, and a baffle disk 90. The piston 88 and the outer disk carrier 82 form the piston space 91 of the clutch E, which can be pressurized via a pressure feed bore 92 in the drive input shaft 3. On the side of the piston 88 opposite to the piston space 91 are arranged the restoring spring 89 and the baffle 90, so that a pressure equalization space 94 pressure-tight relative to the piston 88 is formed between the piston 88 and the baffle 90. In this way the dynamical pressure of the rotating piston space 91 of the clutch E is compensated, preferably completely but at least in part. In the example shown, lubricant is supplied to the pressure equalization space 94 via the central lubricant bore of the drive input shaft 3 and via a radial lubricant feed bore 95 of the drive input shaft 3.

As the output element of the clutch E, an inner disk carrier 85 comprises a cylindrical section 86 extending in the axial direction radially under the disks 80 of the clutch E, and a disk-shaped section 87, which is in fixed connection with a centrally located web shaft 5. The connection of the web shaft 5 to the main planetary gear set is not shown.

As the output element of the clutch A, an inner disk carrier 56 comprises a cylindrical section 57 and a disk-shaped section 58. The cylindrical section 57 extends radially under the disks 50 of the clutch A, in the axial direction from the disks 50 of the clutch A as far as over the disks 80 of the clutch E. On the side of the disks 80 of the clutch E facing away from the reduction planetary gear set 10, the disk-shaped section 58 of the inner disk carrier 56 joins the cylindrical section 57 and extends centrally toward the web shaft 5, as far as a first solar shaft 6 running coaxially above the web shaft 5, with which it is in fixed connection. The connection of the said first solar shaft 6 to the main planetary gear set is not shown. Thus, the output element of the clutch A overlaps the clutch E completely.

Apart from mentioning that a servomechanism 71 of the clutch B, besides an actuation device for the disks 70 of the clutch B, also comprizes dynamical pressure compensation means, that the outer disk carrier 72 of the clutch B and the inner disk carrier 103 of the brake C are advantageously designed as integral, and that an outer disk carrier 102 of the brake C and a servomechanism 101 of the brake C, in an assembly-friendly design, are integrated in a mounting plate 45 fixed in the gearbox housing 40 in a rotationally immobile and axially secured way, no more detailed description of the design and configuration of the individual structural elements of the clutch B and the brake C will be given, because of their substantial similarity to FIG. 1.

As can be seen from FIG. 3, this is therefore an exceptionally compact and structurally space-saving configuration of a structural group comprising the reduction planetary gear set 10 and the first, second and fifth shifting elements A, B, E, with optimum lubricant supply to the rotationally highly loaded planetary gear wheels 12, 15 of the reduction planetary gear set 10.

As already mentioned, the design features and arrangements of the individual structural elements of the five shifting elements A to E of the reduction planetary gear set 10 and the main planetary gear set 30, shown in FIGS. 1 and 3, should be regarded as examples. In relation to further suitable arrangements of the structural elements of the automatic gearbox and in relation to other suitable component designs, reference should be made to the simultaneous patent application with internal file number "8267 S" by the present Applicant.

In this simultaneous patent application with internal file number "8267 S" by the present applicant, a multi-speed gearbox comparable in relation to its gear set concept is disclosed, with an reduction planetary gear set made as a Plus transmission and a multi-component main planetary gear set preferably made as a Ravigneaux gear set, such that with a total of six shifting elements at least six forward speeds can be engaged without range change. As in the present invention, so too in that case the output speed of the reduction planetary gear set can be transmitted via a first and a second shifting element to two input elements of the main planetary gear set not connected to one another and the input speed of the gearbox via a fifth shifting element to a third free input element of the main planetary gear set. Compared with the present invention, in that case the reduction planetary gear set can always be engaged via the sixth shifting element of the gearbox. As regards the design of the individual structural elements of the gearbox and their arrangement relative to one another within the gearbox housing, numerous variants are disclosed, in particular various arrangements of the shifting elements and their servomechanisms relative to one another and relative to the planetary gear set elements, and various arrangements of a spur gear stage relative to the shifting elements and planetary gear sets.

The present invention is based on the use of only five shifting elements. Those with knowledge of the field will be able to combine in appropriate ways the present gear set concept comprising five shifting elements with the various designs and arrangements of the individual components that are disclosed in the above-mentioned simultaneous patent application with internal file number "8267 S" by the present applicant, such that the sixth shifting element by means of which the reduction planetary gear set can be engaged, is then omitted. Within the scope of the present application, separate protection is claimed for all these possible combinations.

REFERENCE NUMERALS

A, B, C
D, E shifting elements
n_input gearbox input speed
n_vs output speed of the reduction planetary gear set
n_output gearbox output speed
1 engine shaft
2 torque converter
3 drive input shaft
4 drive output shaft
5 web shaft
6 first solar shaft
7 second solar shaft
10 reduction planetary gear set RS1
11 solar gear wheel of the reduction planetary gear set
12 inner planetary gear wheel of the reduction planetary gear set
13 bolts of the inner planetary gear wheel of the reduction planetary gear set
14 web of the inner planetary gear wheels of the reduction planetary gear set
15 outer planetary gear wheel of the reduction planetary gear set
16 bolts of the outer planetary gear wheel of the reduction planetary gear set
17 web of the outer planetary gear wheels of the reduction planetary gear set
18 web plate of the coupled webs of the inner and outer planetary gear wheels of the reduction planetary gear set
19 sealing element of the web plate
20 lubricant oil feed to the planetary gear wheels of the reduction planetary gear set
21 annular gear wheel of the reduction planetary gear set
22 annular gear wheel support of the annular gear wheel of the reduction planetary gear set
30 main planetary gear set, consisting of RS2 and RS3
31 small solar gear wheel of the main planetary gear set
32 large solar gear wheel of the main planetary gear set
33 first planetary gear wheel of the main planetary gear set
34 second planetary gear wheel of the main planetary gear set
35 web of the first planetary gear wheel of the main planetary gear set
36 web of the second planetary gear wheel of the main planetary gear set
37 annular gear wheel of the main planetary gear set
40 gearbox housing
41 gearbox housing wall
42 intermediate plate
43 cylindrical projection of the gearbox housing wall or the intermediate plate
44 hub of the intermediate plate
45 mounting plate
50 disks of the clutch A
51 servomechanism of the clutch A
52 outer disk carrier of the clutch A
53 cylindrical section of the outer disk carrier of the clutch A
54 disk-shaped section of the outer disk carrier of the clutch A
55 hub of the outer disk carrier of the clutch A
56 inner disk carrier of the clutch A
57 cylindrical section of the inner disk carrier of the clutch A
58 disk-shaped section of the inner disk carrier of the clutch A
59 piston of the clutch A
60 restoring spring of the piston of the clutch A
61 baffle disk of the clutch A
62 piston space of the clutch A
63 pressure feed channel of the hub of the intermediate plate of the piston space of the clutch A
64 pressure feed channel of the hub of the outer disk carrier of the clutch A
65 pressure equalization space of the clutch A
66 lubricant feed channel of the hub of the outer disk carrier of the clutch A to the pressure equalization space of the clutch A
67 lubricant feed bore of the drive input shaft to the pressure equalization space of the clutch A and to the planetary gear wheels of the reduction planetary gear set
70 disks of the clutch B
71 servomechanism of the clutch B
72 outer disk carrier of the clutch B
73 cylindrical section of the outer disk carrier of the clutch B
74 disk-shaped section of the outer disk carrier of the clutch B
75 inner disk carrier of the clutch B
76 cylindrical section of the inner disk carrier of the clutch B
77 disk-shaped section of the inner disk carrier of the clutch B
80 disks of the clutch E
81 servomechanism of the clutch E
82 outer disk carrier of the clutch E
83 cylindrical section of the outer disk carrier of the clutch E
84 disk-shaped section of the outer disk carrier of the clutch E
85 inner disk carrier of the clutch E
86 cylindrical section of the inner disk carrier of the clutch E
87 disk-shaped section of the inner disk carrier of the clutch E
88 piston of the clutch E
89 restoring spring of the piston of the clutch E
90 baffle disk of the clutch E
91 piston space of the clutch E
92 pressure feed bore of the drive shaft to the piston space of the clutch E
93 pressure feed channel of the hub of the intermediate plate to the piston space of the clutch E
94 pressure equalization space of the clutch E
95 lubricant feed bore of the drive shaft to the pressure equalization space of the clutch E
100 disks of the brake C
101 servomechanism of the brake C
102 outer disk carrier of the brake C
103 inner disk carrier of the brake C
110 disks of the brake D
111 servomechanism of the brake D
112 outer disk carrier of the brake D
113 inner disk carrier of the brake D

The invention claimed is:

1. A multi-speed gearbox, with a drive input shaft (3) connected to a reduction planetary gear set (10), with a drive output shaft (4) connected to a main planetary gear set (30), with first, second, third, fourth and fifth shifting elements (A to E) by the selective engagement of which six forward speeds can be engaged and a gearbox input speed (n_input) of the drive input shaft (3) can be transmitted to drive output shaft (4) in such a manner that of the shifting elements which are actuated for any speed, in order to shift from one speed to a next higher or a next-lower speed, only one shifting element is disengaged and a different shifting element is engaged, such that the main planetary gear set (30) has three uncoupled input elements, an output element of the reduction planetary gear set (10) can be connected, via a first shifting element (A), to a first input element of the main planetary gear set (30) and, via a second shifting element (B), to a second input element of the main planetary gear set (30), the drive input shaft (3) can be connected via, a fifth shifting element (E), to a third input element of the main planetary gear set (30) and an element of the reduction planetary gear set (10) is fixed, the reduction planetary gear set (10) is a plus transmission with inner and outer planetary gear wheels (12, 15) whose webs (14, 17) are coupled to one another;

wherein the coupled webs (14, 17) of the inner and outer planetary gear wheels (12, 15) of the reduction planetary gear set (10) are connected to one another by a web plate (18), an input element of the fifth shifting element (E) is axially directly adjacent to the web plate (18), the web plate (18) is sealed against the input element of the fifth shifting element (E) on a diameter above bolts (13, 16) respectively of the inner and outer planetary gear wheels (12, 15) of the reduction planetary gear set (10), and lubricant is fed (20) to the inner and outer planetary gear wheels (12, 15) of the reduction planetary gear set (10) via an axial gap between the web plate (18) and the input element of the fifth shifting element (E).

2. The multi-speed gearbox according to claim 1, wherein the coupled webs (14, 17) of the reduction planetary gear set (10) are connected to the drive input shaft (3), an annular gear wheel (21) of the reduction planetary gear set (10) can be connected to the first and second input elements of the main planetary gear set (30), and a sun gear wheel (11) of the reduction planetary gear set (10) is fixed on a gearbox housing (40).

3. The multi-speed gearbox according to claim 1, wherein the reduction planetary gear set (10) is positioned near a gearbox housing wall (41) of a gearbox housing (40), in a radial direction at least partly above a projection (43) of the gearbox housing wall (41) or a hub (44) in fixed connection with the gearbox housing wall (41), the gearbox housing wall (41) is formed as part of the gearbox housing (40) or as an intermediate plate (42) in fixed connection to the gearbox housing (40), and a sun gear wheel (11) of the reduction planetary gear set (10) is in active connection with one of the projection (43) or the hub (44).

4. The multi-speed gearbox according to claim 3, wherein the gearbox housing wall (41) is located on a side of the gearbox housing (40) which faces toward an engine shaft (1) of a drive engine of the multi-speed gearbox which is in active connection with the drive input shaft (3).

5. The multi-speed gearbox according to claim 3, wherein the gearbox housing wall is located on a side of the gearbox housing toward an engine shaft of a drive engine.

6. The multi-speed gearbox according to claim 1, wherein the reduction planetary gear set (10) and the first, second and fifth shifting elements (A, B, E) are arranged together, on one side of the main planetary gear set (30).

7. The multi-speed gearbox according to claim 1, wherein the fifth shifting element (E) is located between the reduction planetary gear set (10) and the main planetary gear set (30), axially directly adjacent to the reduction planetary gear set (10).

8. The multi-speed gearbox according to claim 1, wherein disks (50, 70) of the first and the second shifting elements (A, B are arranged axially adjacent to one another.

9. The multi-speed gearbox according to claim 1, wherein disks (70) of the second shifting element (B) are closer to the main planetary gear set (30) than disks (50) of the first shifting element (A).

10. The multi-speed gearbox according to claim 1, wherein at least one disk (50) of the first shifting element (A) are positioned directly adjacent to the reduction planetary gear set (10).

11. The multi-speed gearbox according to claim 1, wherein disks (50) of the first shifting element (A) are arranged at least partly radially above the reduction planetary gear set (10) and at least partly radially above disks (80) of the fifth shifting element (E).

12. The multi-speed gearbox according to claim 1, wherein the second shifting element (B) is located between the first shifting element (A) and the main planetary gear set (30).

13. The multi-speed gearbox according to claim 1, wherein disks (70) of the second shifting element (B) are axially adjacent to disks (50) of the first shifting element (A) in a direction of the main planetary gear set (30).

14. The multi-speed gearbox according to claim 1, wherein disks (70) of the second shifting element (B) are arranged at least partly radially above the fifth shifting element (E).

15. The multi-speed gearbox according to claim 1, wherein a servomechanism (51) of the first shifting element (A) is positioned at least partly on a side of the reduction planetary gear set (10) facing toward from the main planetary gear set (30), at least one of radially above a projection (43) of a gearbox housing wall (41) and radially above a hub (44) connected to the gearbox housing wall (41), adjacent to the reduction planetary gear set (10).

16. The multi-speed gearbox according to claim 1, wherein an input element of the first shifting element (A) is mounted on one of a projection (43) of a gearbox housing wall (41) and on a hub (44) fixed on the gearbox housing wall (41).

17. The multi-speed gearbox according to claim 1, wherein an output element of the first shifting element (A) radially overlaps, in an axial direction, the fifth shifting element (E).

18. The multi-speed gearbox according to claim 1, wherein an output element of the first shifting element (A) passes through a clutch space of the second shifting element (B).

19. The multi-speed gearbox according to claim 1, wherein disks of the second shifting element are arranged one or more of at least partly radially above the reduction planetary gear set and at least partly radially above disks of the fifth shifting element.

20. The multi-speed gearbox according to claim 1, wherein disks of the first shifting element are axially adjacent to disks of the second shifting element in a direction of the main planetary gear set.

21. The multi-speed gearbox according to claim 1, wherein disks of the first shifting element are positioned at least partly radially above disks of the fifth shifting element.

22. The multi-speed gearbox according to claim 1, wherein an input element of the second shifting element is mounted on at least one projection in one of a gearbox housing wall and on a hub attached to the gearbox housing wall.

23. The multi-speed gearbox according to claim 22, wherein at least one pressure medium channel, for the supply of pressure medium to a servomechanism of the second shifting element, is formed in one the at least one projection in one of the gearbox housing wall and in the hub attached to the gearbox housing wall.

24. The multi-speed gearbox according to claim 1, wherein a servomechanism of the first shifting element is positioned on a side of disks of the first shifting element facing toward the main planetary gear set, and the servomechanism of the first shifting element actuates the disks of the first shifting element from a side facing toward the main planetary gear set.

25. The multi-speed gearbox according to claim 1, wherein a servomechanism of the second shifting element is located on a side of disks of the second shifting element facing away from the main planetary gear set, and the servomechanism of the second shifting element actuates the disks of the second shifting element from a side facing away from the main planetary gear set.

26. The multi-speed gearbox according to claim 1, wherein the fifth shifting element is axially adjacent to one of the first and the second shifting element on a side of the first or the second shifting element facing toward the main planetary gear set, and disks of the fifth shifting element are axially adjacent to disks of one of the first or second shifting element.

27. The multi-speed gearbox according to claim 26, wherein the fifth shifting element is closer to the main planetary gear set than the first or second shifting element.

28. The multi-speed gearbox according to claim 1, wherein the third input element of the main planetary gear set (30) is connected via a web shaft (5) with an output element of the fifth shifting element (E), the first input element of the main planetary gear set (30) is connected via a first sun shaft (6) with an output element of the first shifting element (A), and the second input element of the main planetary gear set (30) is connected via a second sun shaft (7) with an output element of the second shifting element (B), such that the web shaft (5) passes centrally through the main planetary gear set (30), and such that the first sun shaft (6) at least one of runs between the reduction and main planetary gear sets (10, 30) radially above the web shaft (5) and is mounted thereon, and the second sun shaft (7) at least one of runs between the reduction and main planetary gear sets (10, 30) radially above the first sun shaft (6) and is mounted thereon.

29. The multi-speed gearbox according to claim 1, wherein the main planetary gear set (30) is made as a Ravigneaux planetary gear set, with a sun gear wheel (31) as the first input element, with a sun gear wheel (32) as the second input element, with coupled webs (35, 36) as the third input element, and an annular gear wheel (37) as the output element of the main planetary gear set (30).

30. The multi-speed gearbox according to claim 1, wherein the annular gear wheel (21) of the reduction planetary gear set (10) is connected to an outer disk carrier (52) of the first shifting element (A) and to an inner disk carrier (75) of the second shifting element (B).

31. The multi-speed gearbox according to claim 1, wherein the drive input shaft (3) and the drive output shaft (4) are coaxial with one another.

32. A multi-speed gearbox, with a drive input shaft (3) connected to a reduction planetary gear set (10), with a drive output shaft (4) connected to a main planetary gear set (30), with first, second, third, fourth and fifth shifting elements (A to E) by the selective engagement of which six forward speeds can be engaged and a gearbox input speed (n_input) of the drive input shaft (3) can be transmitted to drive output shaft (4) in such a manner that of the shifting elements which are actuated for any speed, in order to shift from one speed to a next higher or a next-lower speed, only one shifting element is disengaged and a different shifting element is engaged, such that the main planetary gear set (30) has three uncoupled input elements, an output element of the reduction planetary gear set (10) can be connected, via a first shifting element (A), to a first input element of the main planetary gear set (30) and, via a second shifting element (B), to a second input element of the main planetary gear set (30), the drive input shaft (3) can be connected via, a fifth shifting element (E), to a third input element of the main planetary gear set (30) and an element of the reduction planetary gear set (10) is fixed, the reduction planetary gear set (10) is a plus transmission with inner and outer planetary gear wheels (12, 15) whose webs (14, 17) are coupled to one another;

wherein an input element of at least one of the first shifting element (A) and the second shifting element (B) is mounted on one of a projection (43) of a gearbox housing wall (41) or on a hub (44) fixed on the gearbox housing wall (41), and at least one pressure medium channel for the supply of pressure medium to a servomechanism (51) of the first shifting element (A) is formed in one or more of the projection (43) of the gearbox housing wall (41) and the hub (44) attached to the gearbox housing wall (41).

33. A multi-speed gearbox, with a drive input shaft (3) connected to a reduction planetary gear set (10), with a drive output shaft (4) connected to a main planetary gear set (30), with first, second, third, fourth and fifth shifting elements (A to E) by the selective engagement of which six forward speeds can be engaged and a gearbox input speed (n_input) of the drive input shaft (3) can be transmitted to drive output shaft (4) in such a manner that of the shifting elements which are actuated for any speed, in order to shift from one speed to a next higher or a next-lower speed, only one shifting element is disengaged and a different shifting element is engaged, such that the main planetary gear set (30) has three uncoupled input elements, an output element of the reduction planetary gear set (10) can be connected, via a first shifting element (A), to a first input element of the main planetary gear set (30) and, via a second shifting element (B), to a second input element of the main planetary gear set (30), the drive input shaft (3) can be connected via, a fifth shifting element (E), to a third input element of the main planetary gear set (30) and an element of the reduction planetary gear set (10) is fixed, the reduction planetary gear set (10) is a plus transmission with inner end outer planetary gear wheels (12, 15) whose webs (14, 17) are coupled to one another;

wherein the third input element of the main planetary gear set (30) is connected via a web shaft (5) with an output element of the fifth shifting element (E), the first input element of the main planetary gear set (30) is connected via a first sun shaft (6) with an output element of the first shifting element (A), and the second input element of the main planetary gear set (30) is connected via a second sun shaft (7) with an output element of the second shifting element (B), such that the web shaft (5) passes centrally through the main planetary gear set (30), and such that the first sun shaft (6) at least one of runs between the reduction and main planetary gear sets (10, 30) radially above the web shaft (5) and is mounted thereon, and the second sun shaft (7) at least one of runs between the reduction and main planetary gear sets (10, 30) radially above the first sun shaft (6) and is mounted thereon, and the second sun shaft (7) is mounted by a mounting plate (45) which is in fixed connection with the gearbox housing (40) or is made as part of the latter.

\* \* \* \* \*